June 21, 1938. LE GRAND S. WHEDON ET AL 2,121,238
VEHICLE SEAT STRUCTURE
Filed March 27, 1935
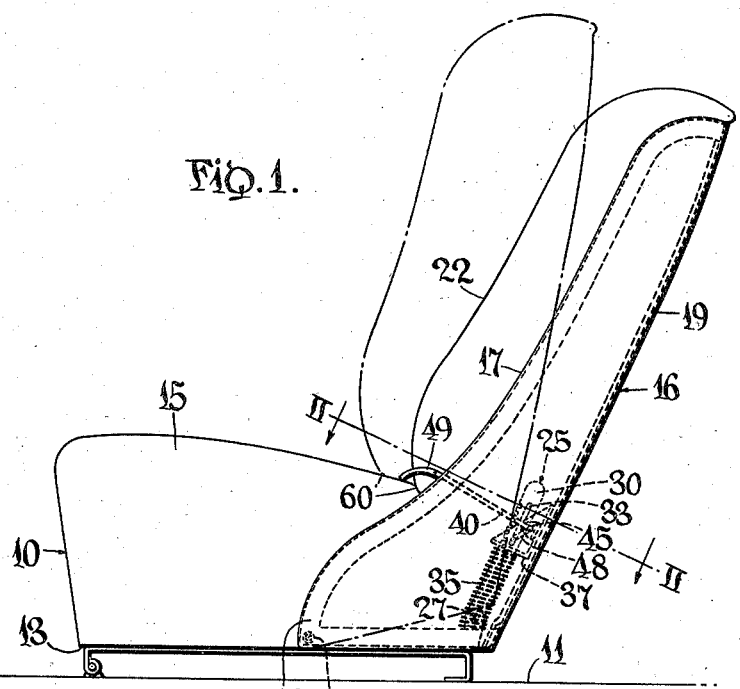
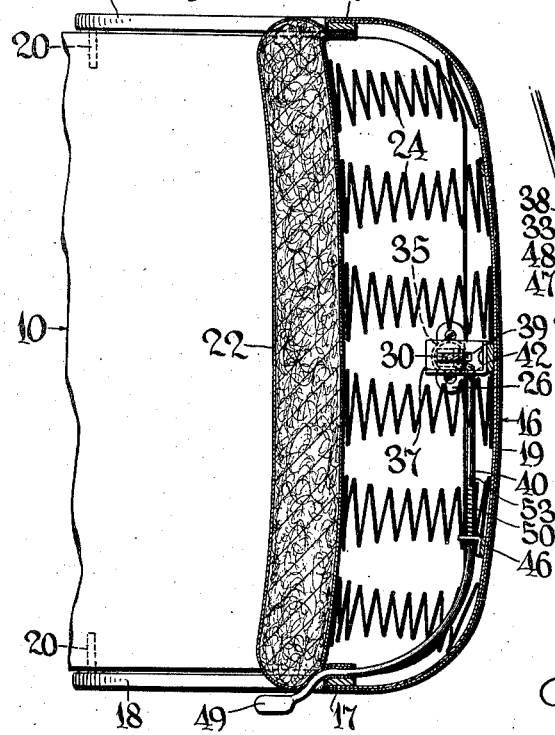
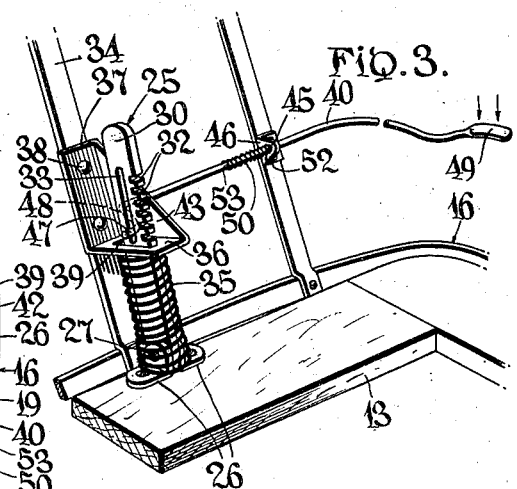
INVENTORS
LeGrand S. Whedon,
Albert A. Grinnell
BY
Beau, Brooks, Buckley & Beau.
ATTORNEYS Patented June 21, 1938

2,121,238

UNITED STATES PATENT OFFICE 2,121,238

VEHICLE SEAT STRUCTURE

Le Grand S. Whedon and Albert A. Grinnell, Medina, N. Y., assignors, by mesne assignments, to Le Grand S. Whedon, Medina, N. Y.

Application March 27, 1935, Serial No. 13,357

1 Claim. (Cl. 155—163)

This invention relates to seats adapted for installation in vehicles and it has particular relation to an improved structure for varying the posture of passengers riding in a vehicle.

One object of the invention is to provide an improved arrangement and relationship between a seat back and seat bottom together with mechanism for changing the relative position of these members.

Another object of the invention is to provide an improved arrangement for mounting and controlling a seat back supporting shell upon a seat bottom.

In arranging vehicle structure it is desirable that the passengers seated in the vehicle shall be able to change their positions according to individual taste and without discomfort. A number of attempts have been made to provide a seating structure which will accommodate passengers of various sizes and physical characteristics in various positions which they may desire to assume, but considerable difficulty has been encountered in designing a structure which is suitable for the purposes specified and is also sufficiently simple and inexpensive as to be practical for use in the smaller and less expensive passenger vehicles.

One of the primary advantages of this invention resides in a seat installation which will be suitable for the less expensive type of vehicle and which is so simple and inexpensive in structure as to add no appreciable cost to the manufacture of the vehicle as a whole. That is, the invention can be incorporated in the vehicle upon manufacture thereof and elements of the invention substituted for the means commonly employed to provide for more or less inconvenient adjustment, and in many cases, unsatisfactory adjustment.

In the drawing:

Fig. 1 is a side elevation of a seating structure in which the invention has been incorporated;

Fig. 2 is a fragmentary cross section, on a larger scale, taken substantially along the line II—II of Fig. 1; and Fig. 3 is a fragmentary perspective of adjusting and locking structure included in the invention.

In practicing the invention a seat bottom 10 is provided with a suitable support 11, which can be the floor of a motor vehicle, or other device, according to the type of structure in which the invention is to be incorporated, and this bottom includes a lower frame 13 supporting a seat cushion 15. The seat bottom is of such construction as to be adapted to be either bodily movable or secured in a stationary position.

At the rear portion of the seat bottom, a frame or shell 16 composed of metal or other durable material is formed with side flanges 17, forwardly projecting lower arms 18, and back 19. Suitable pivotal connections 20, carried by the seat frame 13 at locations intermediate the forward and rearward portions of the seat bottom, pivotally support the forward ends of the arms 18 of the shell and provide for forward and rearward swinging action of the back of the shell along a forward and upward arc from the rear of the seat bottom. A cushion 22, including conventional cushion springs 24, is mounted in the shell 16 to complete the seat back structure. Thus the seat back is bodily movable within predetermined limits about the pivotal connections 20.

An adjusting device 25 for the seat back is provided with brackets 26 bolted to the rear upper portion of the seat bottom frame 13 and a pivotal bolt 27 mounted thereon pivotally supports an upright bar 30 that has notches 32 formed in the forward edge thereof. The upper portion of the bar also has a slot 33 extending longitudinally therein. A coil spring 35 normally under compression surrounds the bar 30 and has its lower end resting upon the brackets 26, while its upper end presses against the lower surface of a flange 36 that is a part of an angular bracket 37. Conventional fastening devices 38 secure the bracket 37 to an intermediate back frame portion 34 of the shell 16. The upper end portion of the bar 30 extends through a slot 39 formed in the flange 36 and any of the notches 32 can be engaged with the front edge wall of the slot 39 to lock the bar 30 to the bracket.

An actuating crank rod 40 rotatably mounted in an opening 42 of a flange 43 formed on the bracket 37 and also extending through an opening 45 formed in a second bracket 46, is provided with a finger 47 of crank pin form. The second bracket is mounted upon the back of the shell 16. This finger 47 fits slidably into the slot 33 of the bar 30 and is integral with a crank arm 48 of the rod. A handle or lever portion 49 of the crank rod 40 is adapted to be pressed downwardly to rotate the crank rod 40 in the bearing openings 42 and 45, and thus to release the notches 32 from engagement with the bracket 37. One end portion of a spring 50 is connected, as indicated at 52, to the bracket 46 and its other end is connected, as indicated at 53, to the rod 40. This spring is normally under tension and constantly exerts force in a clockwise direction upon the rod 40, as viewed in Fig. 1, for the purpose of maintaining the notched portion of the bar 30 locked with the bracket 37 and urges the bar toward the locked position as soon as the handle 49 has been released after pressing the latter downwardly.

The coil spring 35 is sufficiently strong to exert considerable force upon the shell 16 tending to pivot it in an upward direction about the connections 20 and this action facilitates adjustment of the seat back. However, this spring is not sufficiently strong to interfere with the movement of the seat back to its rearmost position by pressure because the weight of a passenger seated in the vehicle overcomes the force of the spring. Since the pivotal action of the seat back is provided about the connections 20 at intermediate portions of the seat bottom 10, all portions of the seat back cushion 22 against which the passenger rests are moved forwardly or rearwardly, as the case may be, in addition to the changing of the angle of inclination of the seat back, and as well as materially changing the elevation of the upper end of the seat back. In the rearward position of the seat back, the rear portion of the seat bottom is disposed within the lower portion of the shell 16 between the sides of the shell.

Although the connections 20 are shown as being located upon the sides of the seat bottom, it is apparent that a like connection can be provided as a part of the support 11. However, it is desirable that the connections 20 for the extensions 18 be located intermediate the front and rear extremities of the seat bottom, whether provided upon the seat bottom or upon a separate support.

One of the important advantages of the invention resides in the fact that a passenger seated in the vehicle can adjust the seat back without moving from the seat merely by operating the handle or lever 49 and then by leaning backwardly or forwardly, depending upon the direction in which adjustment is desired. After the crank pin 47 has been actuated in the slot in the upper end of the bar 30 to disengage the notched portion of the bar from the bracket 37, the coil spring 35 causes the seat back to follow the passenger as he leans forward to the desired position, i. e., when the passenger desires to have the back 19 adjusted forwardly. Since the pivotal connections 20 are disposed medially of the seat bottom, the rear portion of the seat bottom and the lower portion of the seat back substantially contact each other within their limits of normal relative movement without materially separating during the pivotal movement of the back.

These conditions of operation are advantageous because the proper relationship between the seat back and seat bottom is retained regardless of the relative position of adjustment, and also the appearance of the seat structure as a whole is not marred by excessive separation of the junction portions of the cushions 15 and 22 which separation would occur if the pivotal connections 20 were located at the rear portion of the seat bottom. In Fig. 1 the full line drawing of the back 16 illustrates the latter in its lowermost and rear position, while the broken lines of this figure illustrate the upward and forward position of the seat back. From this showing it will be apparent that the junction 60 of the cushions 15 and 22 changes materially upwardly and forwardly as the seat back is tilted forwardly.

Thus the seating depth of the cushion 15 is altered and in the forward position of adjustment of the back 19 for a small passenger, the arrangement not only places such passenger nearer the operating parts of the vehicle, but also at a higher elevation.

Although only one form of the invention has been shown and described in detail, it will be apparent to those skilled in the art that the invention is not so limited, but that various changes may be made therein without departing from the spirit of the invention or from the scope of the appended claim.

We claim:

In a seat structure, a pair of pivotally connected seat members, a locking bar having locking elements formed along one side thereof, means pivotally supporting the bar on one seat member at a location spaced from the pivotal connection of said seat members, a bracket mounted upon the other seat member, said bracket having a locking portion normally engaging with one of the locking elements of the bar for releasably locking the latter, means for guiding the bar in proximity to the locking portion of the bracket as the seat members are relatively pivoted, a handle mounted upon one of the seat members and having a crank portion engaging the bar for moving the latter to and from locked position, means cooperating with the handle for constantly urging the bar into locked relation with the bracket, and a spring carried between portions of the seat members and constantly urging them in one direction about their pivotal connection.

LE GRAND S. WHEDON.
ALBERT A. GRINNELL.